United States Patent
Tan

(10) Patent No.: US 10,371,586 B2
(45) Date of Patent: Aug. 6, 2019

(54) HEATED TEMPERATURE SENSOR ASSEMBLY

(71) Applicant: General Electric Company, Schenectady, NY (US)

(72) Inventor: Chiong Siew Tan, Binghamton, NY (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 15/614,031

(22) Filed: Jun. 5, 2017

(65) Prior Publication Data

US 2018/0348069 A1    Dec. 6, 2018

(51) Int. Cl.
*G01K 13/02* (2006.01)
*G01K 1/08* (2006.01)

(52) U.S. Cl.
CPC ............. *G01K 13/02* (2013.01); *G01K 1/08* (2013.01); *G01K 2013/024* (2013.01); *G01K 2205/02* (2013.01)

(58) Field of Classification Search
CPC ....... G01K 2013/024; G01K 2013/026; G01K 13/028; G01K 2205/02
See application file for complete search history.

(56) References Cited

U.S. PATENT DOCUMENTS

| | | | |
|---|---|---|---|
| 3,512,414 A * | 5/1970 | Rees | G01K 13/02 244/134 R |
| 4,821,566 A | 4/1989 | Johnston et al. | |
| 5,025,661 A | 6/1991 | McCormack | |
| 5,466,067 A * | 11/1995 | Hagen | G01K 13/02 374/138 |
| 6,076,963 A * | 6/2000 | Menzies | G01K 13/02 374/135 |
| 6,609,825 B2 | 8/2003 | Ice et al. | |
| 6,651,515 B2 | 11/2003 | Bernard | |
| 6,827,485 B2 * | 12/2004 | Isebrand | G01K 13/02 374/138 |
| 7,441,948 B2 | 10/2008 | Bernard et al. | |
| 2015/0241286 A1 | 8/2015 | Isebrand | |
| 2015/0345327 A1 | 12/2015 | Huang et al. | |
| 2018/0313698 A1 * | 11/2018 | Anderson | G01K 1/20 |

FOREIGN PATENT DOCUMENTS

| | | |
|---|---|---|
| FR | 2840984 A1 | 12/2003 |
| WO | 03106949 A1 | 12/2003 |

OTHER PUBLICATIONS

Houghton et al, "Viscous Flow and Boundary Layers." Aerodynamics for Engineering Students, 2013, . doi: 10.1016/b978-0-08-096632-8.00008-4. pp. 498-510 (Year: 2013).*

* cited by examiner

*Primary Examiner* — Clayton E. LaBalle
*Assistant Examiner* — Leon W Rhodes, Jr.
(74) *Attorney, Agent, or Firm* — Dority & Manning, P.A.

(57) ABSTRACT

A temperature sensor assembly includes a body configured to receive a heated flow of air therein. The body, in turn, includes a leading surface in thermal communication with the heated flow of air, a first concave surface including a first plurality of vents, a second concave surface including a second plurality of vents, and an air injector disposed within the body. The air injector is configured to apply a suction pressure to the first plurality of vents and to the second plurality of vents.

18 Claims, 9 Drawing Sheets

HEATED TEMPERATURE SENSOR ASSEMBLY

BACKGROUND

The field of disclosure relates generally to a temperature sensor assembly and, more particularly, to a temperature sensor assembly for measuring a temperature of a fluid flow.

At least some known temperature sensors have been developed for use with aircraft engines, such as, for example, turboshaft, turbojet, turbofan and turbo-propeller engines. These temperature sensors may include an airfoil and a temperature sensing element disposed downstream of the airfoil. The airfoil is typically aerodynamically shaped and may function, in part, to guide the fluid flow into contact with the temperature sensing element.

Many conventional temperature sensors may include a heating element disposed within the airfoil. The heating element may be configured to heat a leading edge of the airfoil during operation, such that fluid flow impinging on the airfoil is prevented from forming ice over the surface of the airfoil. However, as fluid flow is heated over the surface of the airfoil, the flow may continue downstream over the temperature sensing element, which may, as a result, incorrectly measure an ambient air temperature within the fluid flow.

BRIEF DESCRIPTION

In one aspect, a temperature sensor assembly is provided. The temperature sensor assembly includes a body configured to receive a heated flow of air therein. The body, in turn, includes a leading surface in thermal communication with the heated flow of air, a first concave surface including a first plurality of vents, a second concave surface including a second plurality of vents, and an air injector disposed within the body. The air injector is configured to apply a suction pressure to the first plurality of vents and to the second plurality of vents.

In addition, in various embodiments, the body is a bluff body. Moreover, in various embodiments, the temperature sensor assembly also includes a first member spaced apart from the body and defining a first flow channel in relation to the body. The temperature sensor assembly may also include a second member spaced apart from the body and defining a second flow channel in relation to the body. In some embodiments, the first member and the second member may further define a third flow channel in fluid communication with and downstream of the first flow channel and the second flow channel.

The temperature sensor assembly may also include a sensor element spaced apart from the body and disposed at least partially within the third flow channel. In some embodiments, the first member includes a convex surface, and the first flow channel is defined between the first concave surface of the body and the convex surface. Further, in various embodiments, the second member includes a convex surface, and the second flow channel is defined between the second concave surface of the body and the convex surface. In addition, in some embodiments, the temperature sensor assembly is configured to operate within a range of angles of attack between twenty degrees and minus twenty degrees and/or within a range of angles of attack between fifty degrees and minus fifty degrees.

In another aspect, a temperature sensor assembly is provided. The temperature sensor assembly includes a body configured to receive a heated flow of air from a compressor. The body, in turn, includes a leading surface in thermal communication with the heated flow of air received from compressor, a first plurality of vents, and an air injector disposed within the body, where the air injector is configured to apply a suction pressure to the first plurality of vents. In various embodiments, the body also includes a second plurality of vents, where the air injector is further configured to apply the suction pressure to the second plurality of vents.

In addition, in some embodiments, the body is a bluff body. Further, in various embodiments, the temperature sensor assembly includes a first member spaced apart from the body and defining a first flow channel in relation to the body. The temperature sensor assembly may also include a second member spaced apart from the body and defining a second flow channel in relation to the body. In some embodiments, the first member and the second member further define a third flow channel in fluid communication with and downstream of the first flow channel and the second flow channel. Moreover, in various embodiments, the temperature sensor assembly includes a sensor element spaced apart from the body and disposed at least partially within the third flow channel.

Further still, in some embodiments, the first member includes a convex surface, where the first flow channel is defined between the body and the convex surface. Similarly, in various embodiments, the second member includes a convex surface, where the second flow channel is defined between the body and the convex surface.

In yet another aspect, a method of operating a temperature sensor assembly is provided. The method includes mounting the temperature sensor assembly within an aircraft engine that generates a fluid flow. The temperature sensor assembly includes a body. In turn, the body includes a leading surface, a first concave surface including a first plurality of vents, a second concave surface including a second plurality of vents, and an air injector disposed within the body. The method also includes supplying a heated flow of air from a compressor to an interior portion of the leading surface, applying a suction pressure between the first plurality of vents and the air injector, and applying the suction pressure between the second plurality of vents and the air injector.

DRAWINGS

These and other features, aspects, and advantages of the present disclosure will become better understood when the following detailed description is read with reference to the accompanying drawings in which like characters represent like parts throughout the drawings, wherein.

Figure 1:
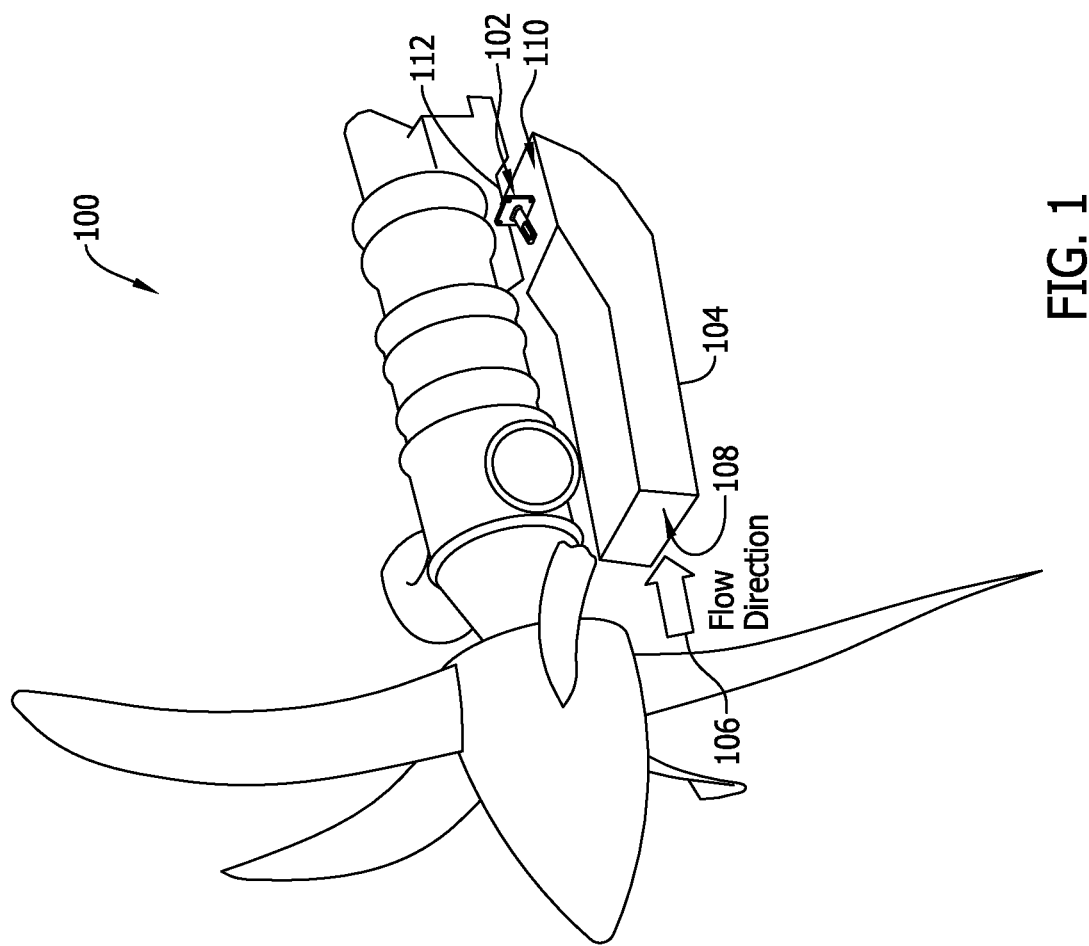
FIG. 1 is a perspective view of an exemplary aircraft engine including an exemplary temperature sensor assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, an "angle of attack" may correspond to an angle measured between a reference line on a body (such as a bluff body) and a vector representing a relative motion between the body and a fluid through which the body moves. In other words, an angle of attack may correspond to an angle measured between a reference line drawn through the body and a reference line representing oncoming fluid flow.

As used herein, a "bluff body" may be defined as a body with a large leading edge radius that can maintain an attached surface flow without causing separated flow over a portion of its surface.

Embodiments of the present disclosure relate to a temperature sensor assembly that includes a bluff body, a first member spaced apart from the bluff body, a second member spaced apart from the bluff body, and a sensor element spaced apart from bluff body. The bluff body may include a substantially planar leading surface, and the sensor element may be disposed downstream of the bluff body between the first member and the second member. In addition, a first flow channel may be defined between the first member and the bluff body, and a second flow channel may be defined between the second member and the bluff body. During operation, a fluid flow may initially impinge upon the substantially planar leading surface of the bluff body, and may subsequently flow downstream into the first flow channel and the second flow channel, where the fluid flow may be guided over the sensor element to sense a temperature of the fluid flow.

FIG. 1 is a perspective view of an exemplary aircraft engine 100 including an exemplary temperature sensor assembly 102. In the exemplary embodiment, aircraft engine 100 is a turbo-propeller engine and includes a flow duct 104 through which a fluid flow 106 travels. However, in various embodiments, aircraft engine 100 may be any other type of aircraft engine, such as a turbofan engine, as well as any type of marine engine, any engine mounted on a terrestrial vehicle, and the like. In the exemplary embodiment, flow duct 104 includes an inlet 108 and an outlet 110, and temperature sensor assembly 102 is mounted on aircraft engine 100 at a location 112 proximate to outlet 110. Where aircraft engine 100 is a turbofan engine, temperature sensor assembly 102 may be mounted proximate an inlet of the turbofan engine and/or within a transition duct of the turbofan engine.

Figure 2:
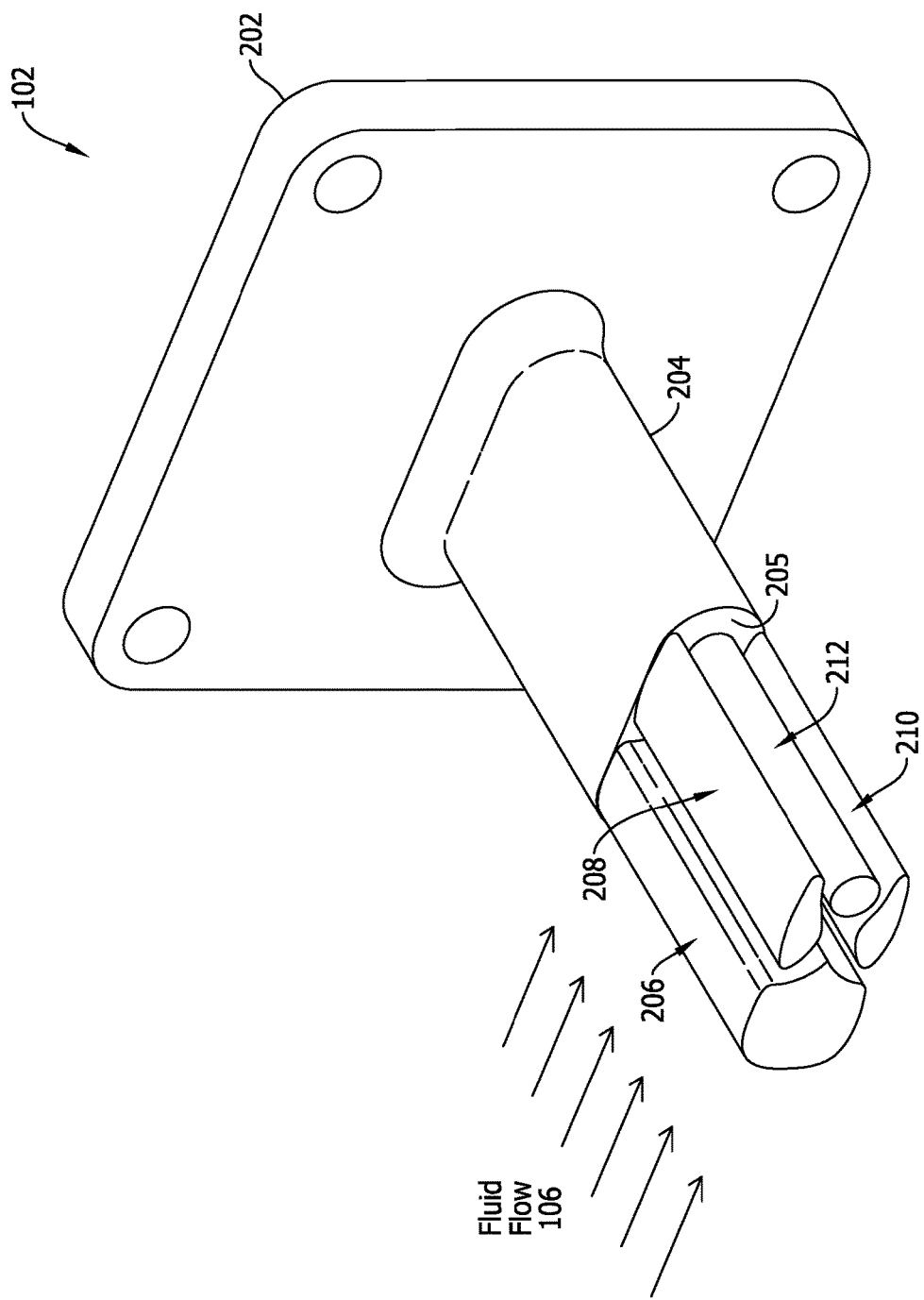
FIG. 2 is a perspective view of the temperature sensor assembly shown in FIG. 1.

FIG. 2 is a perspective view of temperature sensor assembly 102 (shown in FIG. 1). In the exemplary embodiment, temperature sensor assembly 102 includes a flange 202 and a base 204 extending from flange 202. Temperature sensor assembly 102 also includes a bluff body 206, a first member 208 spaced apart from bluff body 206, a second member 210 spaced apart from bluff body 206, and a sensor element 212 spaced apart from bluff body 206. In the exemplary embodiment, bluff body 206, first member 208, second member 210, and sensor element 212 extend from an edge 205 of base 204.

In various embodiments, flange 202 is any flange or mounting bracket configured to be mounted within aircraft engine 100. For example, as described above, flange 202 is any flange or mounting bracket configured to be mounted within a turbofan engine and/or within a turbo-propeller engine.

Base 204 is coupled to and extends from flange 202. For example, base 204 may extend substantially orthogonally and/or non-orthogonally away from flange 202. In various embodiments, where base 204 extends non-orthogonally away from flange 202, base 204 may extends from flange 202 at an angle in the range of zero degrees to sixty degrees. In addition, as described in greater detail below, during operation, base 204 may extend at least partially into fluid flow 106. More particularly, base 204 may function as a riser or pedestal for bluff body 206, first member 208, second member 210, and sensor element 212, each of which may be coupled to base 204 at edge 205 to extend at least partially into fluid flow 106.

Sensor element 212 may include any suitable sensing device, such as any suitable temperature sensing device. In various embodiments, sensor element 212 is mounted within a substantially cylindrical housing and/or any other suitable aerodynamic structure. In other embodiments, sensor element 212 is itself substantially cylindrical and/or otherwise aerodynamically shaped.

Figure 3:
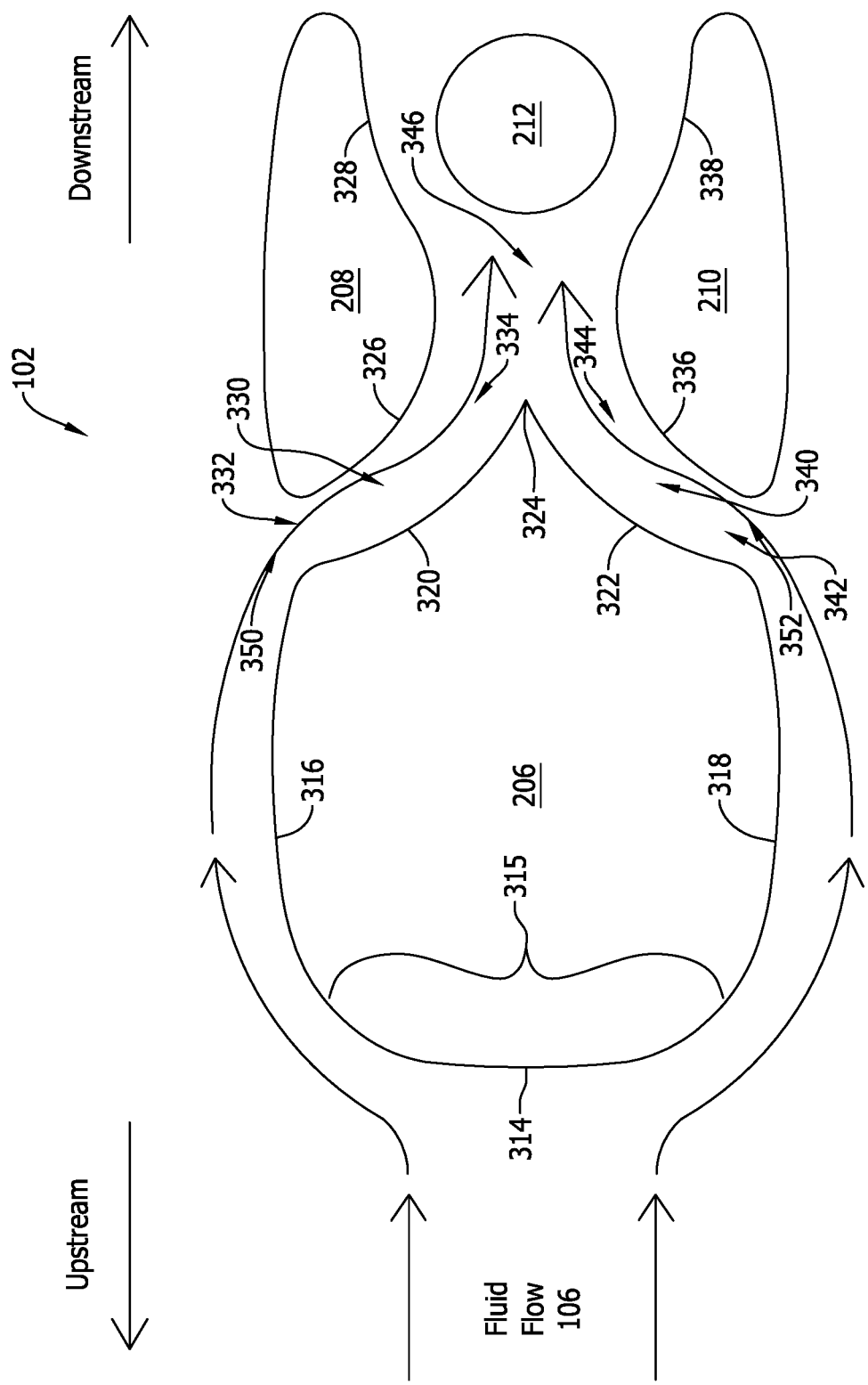
FIG. 3 is a cross-sectional view of the temperature sensor assembly shown in FIG. 1.

FIG. 3 is a cross-sectional view of temperature sensor assembly 102 (shown in FIGS. 1 and 2). As shown, bluff body 206 includes a leading surface 314, a first sidewall 316, a second sidewall 318, a first concave surface 320, a second concave surface 322, and a trailing edge 324. Leading surface 314 may include a substantially planar region 315, upon which fluid flow 106 may impinge, as described herein.

In addition, and as shown, first member 208 is spaced apart from bluff body 206 and is situated downstream of bluff body 206. First member 208 includes a convex surface 326 and a concave surface 328, and a first flow channel 330 is defined between first concave surface 320 of bluff body 206 and convex surface 326 of first member 208. In the exemplary embodiment, first flow channel 330 is a divergent flow channel, in which an inlet 332 of first flow channel 330 is narrower than an outlet 334 of first flow channel 330.

Similarly, second member 210 is spaced apart from bluff body 206 and is situated downstream of bluff body 206. Second member 210 includes a convex surface 336 and a concave surface 338, and a second flow channel 340 is defined between second concave surface 322 of bluff body 206 and convex surface 336 of second member 210. In the exemplary embodiment, second flow channel 340 is a divergent flow channel, in which an inlet 342 of second flow channel 340 is narrower than an outlet 344 of second flow channel 340.

In addition, a third flow channel 346 is defined between concave surface 328 of first member 208 and concave surface 338 of second member 210. Third flow channel 346 is in fluid communication with first flow channel 330 and second flow channel 340 and receives, during operation, at least a portion of fluid flow 106 from one or both of first flow channel 330 and/or second flow channel 340. In the exemplary embodiment, third flow channel 346 is at least partially divergent. In addition, in various embodiments, third flow channel 346 may define, in conjunction with first flow channel 330 and second flow channel 340, a choked flow channel, such as a Venturi tube.

Sensor element 212 may, in addition, be disposed substantially within third flow channel 346, such that a least a portion of fluid flow 106 passing through third flow channel 346 passes over and/or makes contact with sensor element 212. For example, sensor element 212 may be disposed at least partially between concave surface 328 of first member 208 and concave surface 338 of second member 210.

Figure 4:
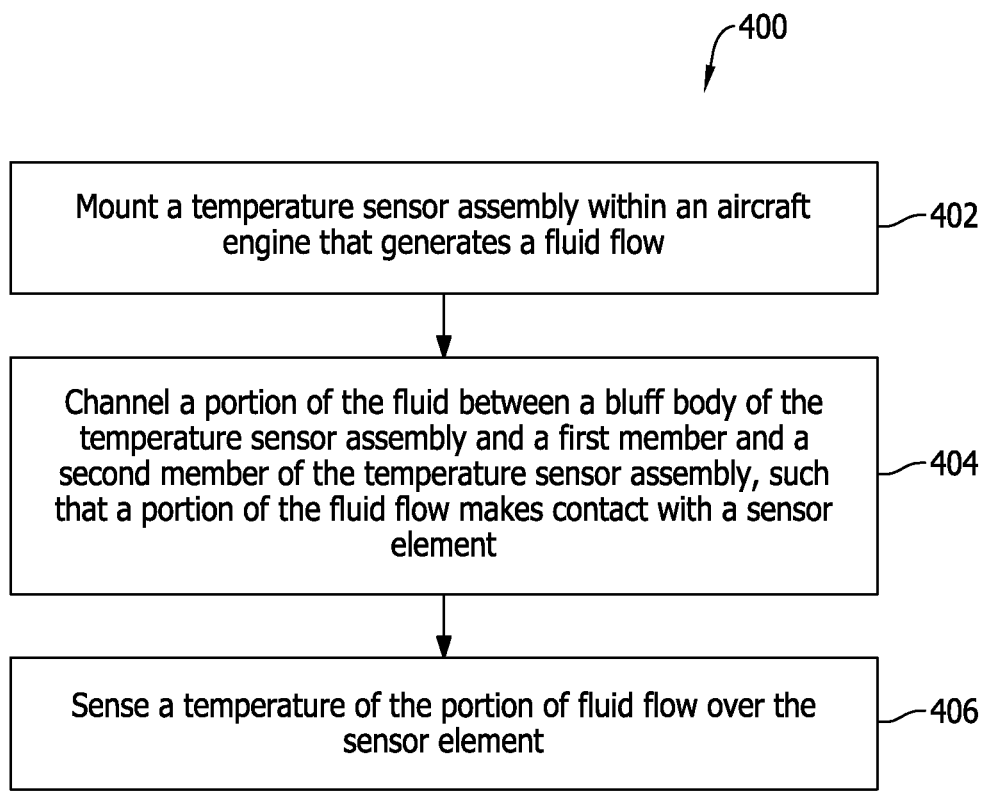
FIG. 4 is a flowchart illustrating an exemplary process for operating the temperature sensor assembly shown in FIG. 1.

FIG. 4 is a flowchart illustrating an exemplary process 400 for operating temperature sensor assembly 102 (shown in FIGS. 1, 2, and 3). Accordingly, in various embodiments, temperature sensor assembly 102 may be mounted within aircraft engine 100, as described above (step 402). More particularly, temperature sensor assembly may be mounted within aircraft engine 100, such that temperature sensor assembly 102 is at least partially surrounded by fluid flow 106.

In addition, as fluid flow 106 impinges upon bluff body 206, at least some of fluid flow 106 is channeled into first flow channel 330 and/or second flow channel 340. Specifically, a first portion 350 of fluid flow 106 enters first flow channel 330, and a second portion 352 of fluid flow 106 enters second flow channel 340. The first portion 350 of fluid flow 106 and/or the second portion 352 of fluid flow 106 are further channeled through third flow channel 346, where each of first portion 350 and/or second portion 352 impinge upon or otherwise flow over sensor element 212 (step 404). Sensor element 212 senses, or measures, a temperature of first portion 350 and/or second portion 352 of fluid flow 106 as first portion 350 and/or second portion 352 of fluid flow 106 impinge upon or otherwise flow over sensor element 212 (step 406).

Thus, temperature sensor assembly 102 is capable of sensing and/or measuring a temperature of fluid flow 106 as temperature sensor assembly 102 is exposed to fluid flow 106 within aircraft engine 100. Temperature sensor assembly is, in addition, capable of accurately measuring a temperature of fluid flow 106 at very steep angles of attack, such as, for example, at angles of attack in the range of +/−20 degrees. In some embodiments, temperature sensor assembly 102 is capable of accurately measuring a temperature of fluid flow 106 at angles of attack in the range of +/−50 degrees.

Figure 5:
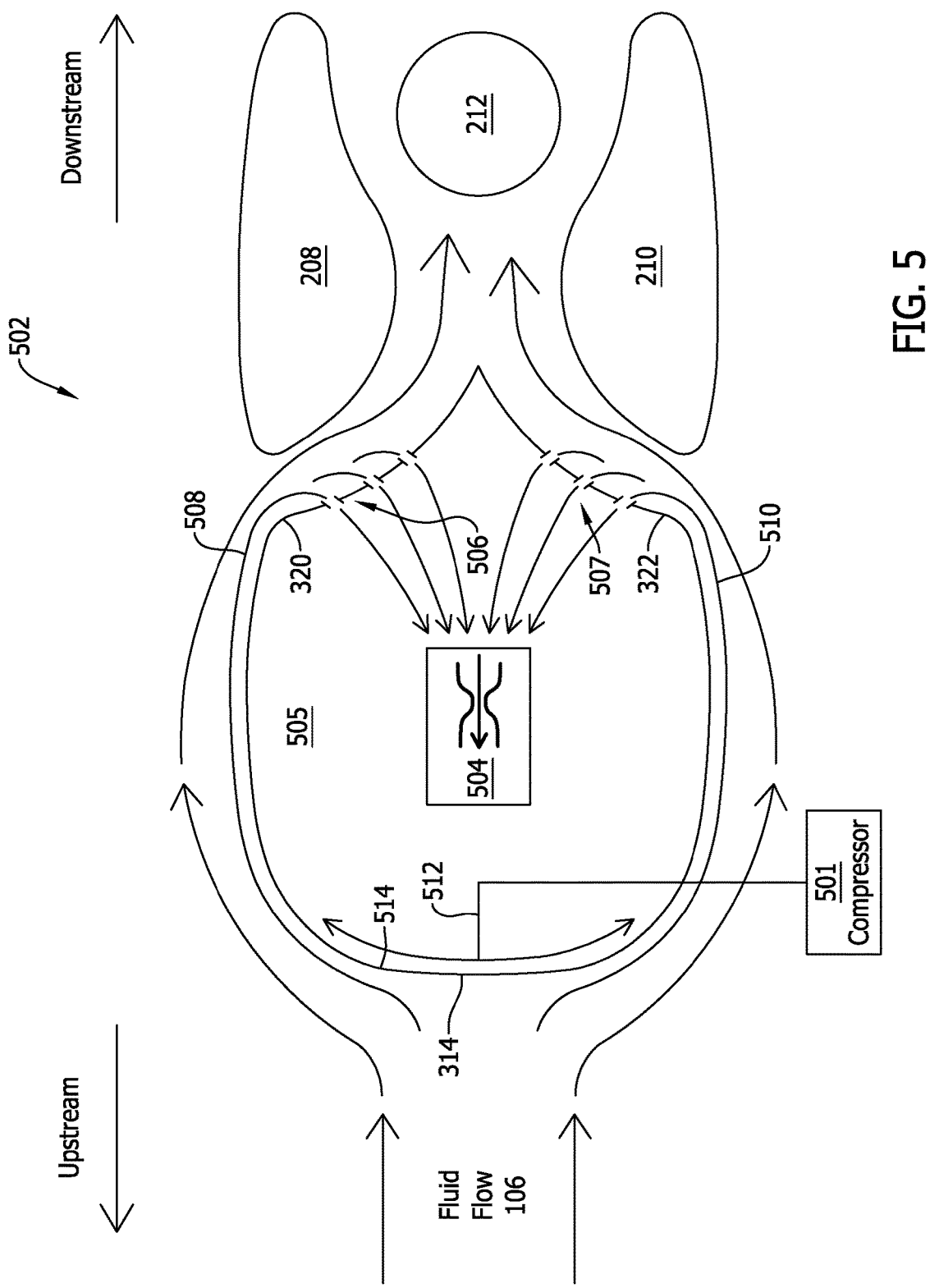
FIG. 5 is a cross-sectional view of an alternative temperature sensor assembly.

FIG. 5 is a cross-sectional view of an alternative temperature sensor assembly 502. In some embodiments, alternative temperature sensor assembly 502 is substantially identical to temperature sensor assembly 102, except, as described herein, that alternative temperature sensor assembly 502 may include an air injector 504, a first plurality of vents 506, and/or a second plurality of vents 507. In other embodiments, air injector 504, first plurality of vents 506, and/or second plurality of vents 507 of alternative temperature sensor assembly 502 may be implemented in any other (e.g., any prior art) temperature sensor assembly, such as, for example, a temperature sensor assembly that includes (as described above) an airfoil in place of a body, such as bluff body 206. In addition, alternative temperature sensor assembly 502 may, in some embodiments, receive heated air (e.g., compressor bleed air) from a compressor 501, which may be coupled to alternative temperature sensor assembly 502.

Thus, for purposes of illustration, alternative temperature sensor assembly 502 includes and is shown with respect to a body 505, which may be a bluff body (e.g., a bluff body, such as bluff body 206, described above), an aerodynamic body, such as an airfoil, and/or any other suitable body having a leading edge and/or leading surface and configured to be disposed upstream of a sensor element, such as sensor element 212.

Air injector 504 may be any device configured to draw air through first plurality of vents 506 and/or second plurality of vents 507 into body 505. For example, air injector 504 may be any electric air pump, any mechanical air pump, any electromechanical air pump, any pneumatic air pump, and the like. In the exemplary embodiment, air injector 504 includes a Venturi tube that is configured to generate suction (e.g., via a fluid pressure differential) within body 505. More particularly, air injector 504 may generate a suction pressure, which may draw air through first plurality of vents 506 and/or second plurality of vents 507 and into air injector 504, whereupon air injector 504 may be configured to throw the ingested air overboard.

First plurality of vents 506 and/or second plurality of vents 507 may be formed in first concave surface 320 and/or second concave surface 322 of body 505. For instance, first plurality of vents 506 and/or second plurality of vents 507 may be one or more perforations, one or more slots, one or more apertures, and the like. First plurality of vents 506 may permit airflow between first concave surface 320 and air injector 504. Similarly, second plurality of vents 507 may permit airflow between second concave surface 322 and air injector 504. In other words, first plurality of vents 506 and/or second plurality of vents 507 may permit air injector 504 to draw at least a portion of fluid flow 106 into body 505. For example, and in various embodiments, first plurality of vents 506 and/or second plurality of vents 507 may permit air injector 504 to draw a first heated portion 508 of fluid flow 106 and/or a second heated portion 510 of fluid flow 106, respectively, into air injector 504 as first heated portion 508 and second heated portion 510 flow over first concave surface 320 and second concave surface 322 of body 505.

Figure 6:
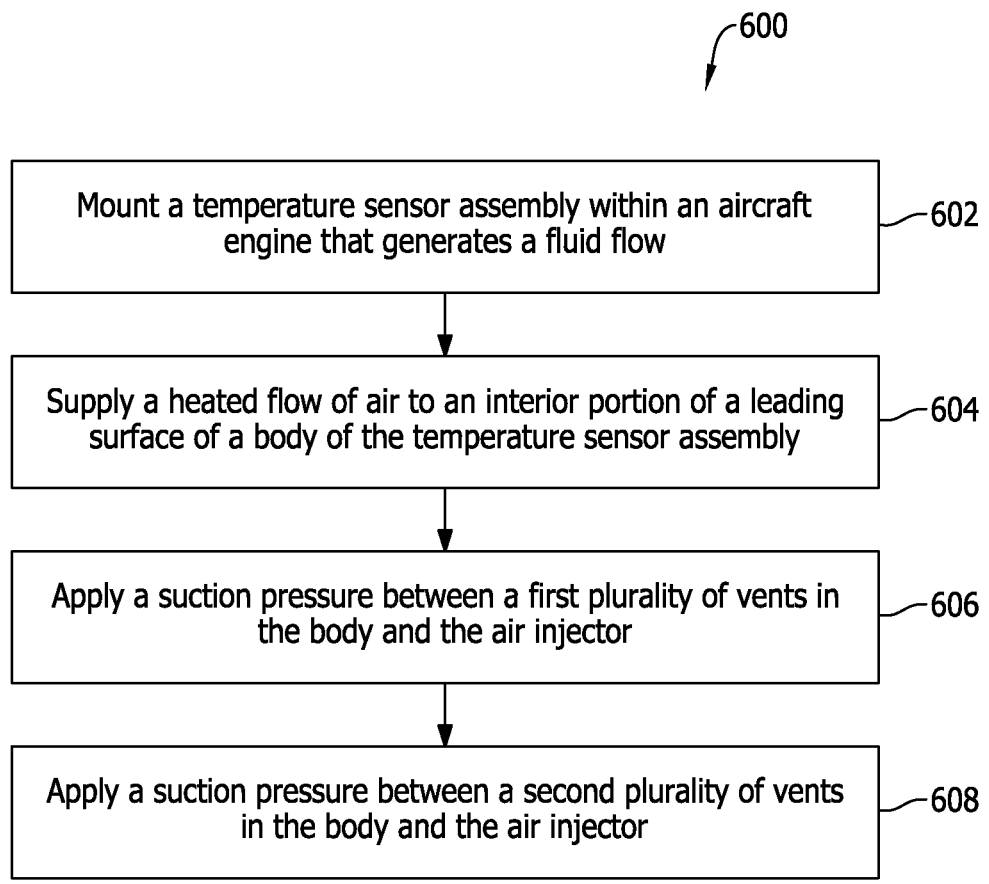
FIG. 6 is a flowchart illustrating an exemplary process for operating the alternative temperature sensor assembly shown in FIG. 5.

FIG. 6 is a flowchart illustrating an exemplary process 600 for operating alternative temperature sensor assembly 502 (shown in FIG. 5). Accordingly, in various embodiments, alternative temperature sensor assembly 502 may be mounted within aircraft engine 100, as described above (step 602). More particularly, alternative temperature sensor assembly 502 may be mounted within aircraft engine 100, such that alternative temperature sensor assembly 502 is at least partially surrounded by fluid flow 106.

In addition, body 505 is configured to receive a heated flow of air therein, and leading surface 314 of body 505 is in thermal communication with the heated flow of air. For example, compressor 501 may supply heated flow 512 of air within body 505, such that heated flow 512 makes contact with an interior portion 514 of leading surface 314 of body 505. (step 604) As heated flow 512 makes contact with interior portion 514 of leading surface 314, heated flow 512 may transfer heat energy to leading surface 314, and as leading surface 314 increases in temperature, leading surface 314 may heat fluid flow 106 as fluid flow 106 impinges on leading surface 314. In other words, compressor 501 may heat leading surface 314, such that fluid flow 106 is heated as it makes contact with leading surface 314. Thus, during operation, alternative temperature sensor assembly 502 may be heated over leading surface 314 to reduce the formation of ice thereon.

Further, as fluid flow 106 is heated and flows over the surface of body 505, some of fluid flow 106 may branch into first heated portion 508 and second heated portion 510. First heated portion 508 and second heated portion 510 may travel (e.g., as substantially laminar flows) over the surface of body 505 and may be aspirated or otherwise suctioned back into body 505 through first plurality of vents 506 and/or second plurality of vents 507, respectively (steps 606 and 608). Thus, air injector 504 may function to aspirate or collect first heated portion 508 and second heated portion 510 of fluid flow 106, such that first heated portion 508 and second heated portion 510 are prevented from traveling further downstream, toward sensor element 212. In other words, air injector 504 may suction first heated portion 508 and second heated portion 510 off before each of first heated portion 508 and second heated portion 510 are able to affect the temperature sensed by sensor element 212 downstream of body 505.

Figure 7:
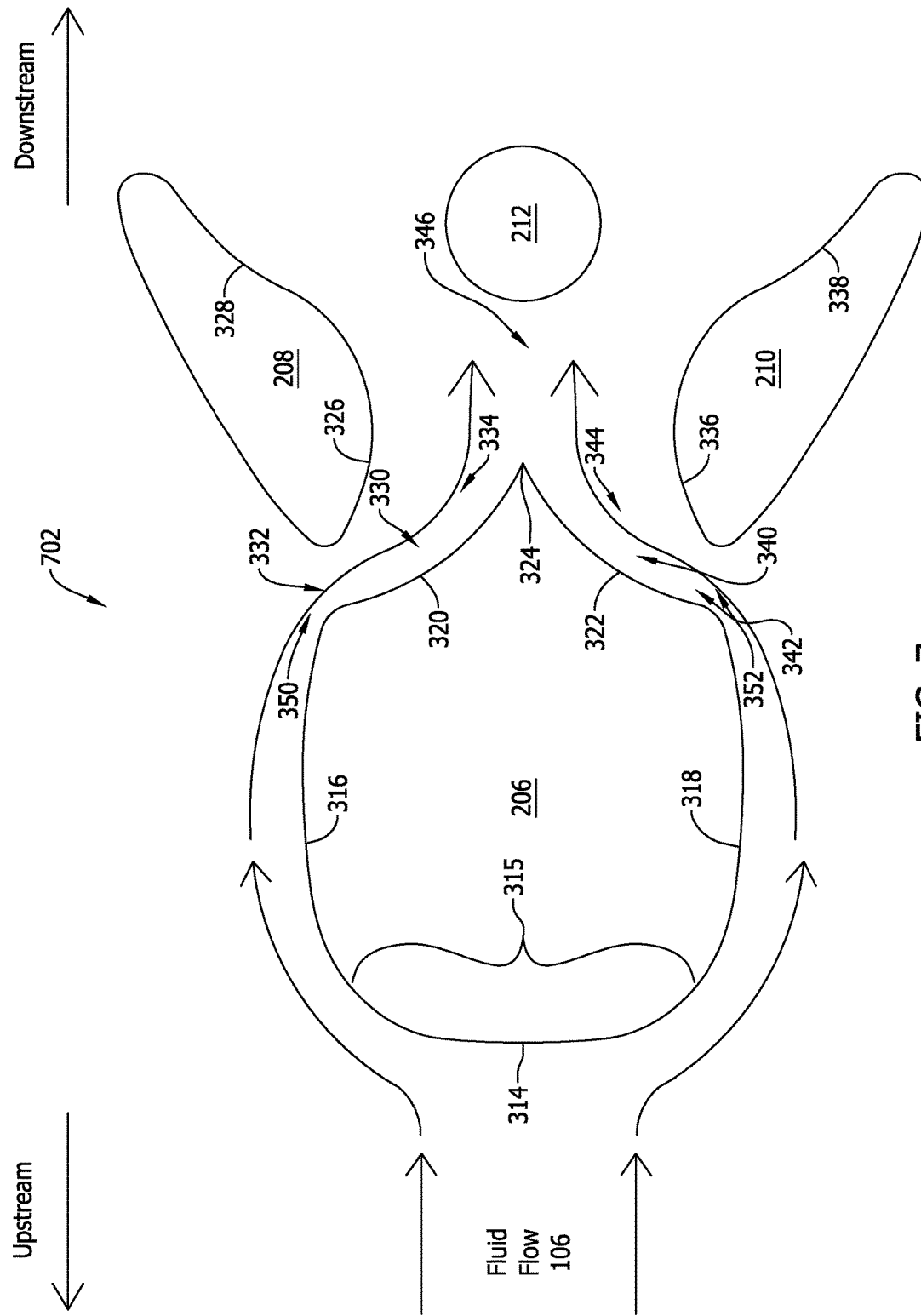
FIG. 7 is a cross-sectional view of another alternative temperature sensor assembly having a pitched geometry.

FIG. 7 is a cross-sectional view of an alternative temperature sensor assembly 702 having a pitched geometry. Alternative temperature sensor assembly 702 is substantially identical to temperature sensor assembly 102, except that the geometry of alternative temperature sensor assembly 702 is configured to increase the amount of fluid flow 106 over sensor element 212. To this end, alternative temperature sensor assembly 702 also includes (like temperature sensor assembly 102) bluff body 206, first member 208, and second member 210. However, as shown, first member 208 and second member 210 are pitched into fluid flow 106 to increase the amount of fluid flow 106 flowing over sensor element 212. Otherwise, alternative temperature sensor assembly 702 is identical to temperature sensor assembly 102. In addition, alternative temperature sensor assembly 702 may, like alternative temperature sensor assembly 502, include a plurality of vents and/or an air injector configured to suction heated airflow into alternative temperature sensor assembly 702.

Figure 8:
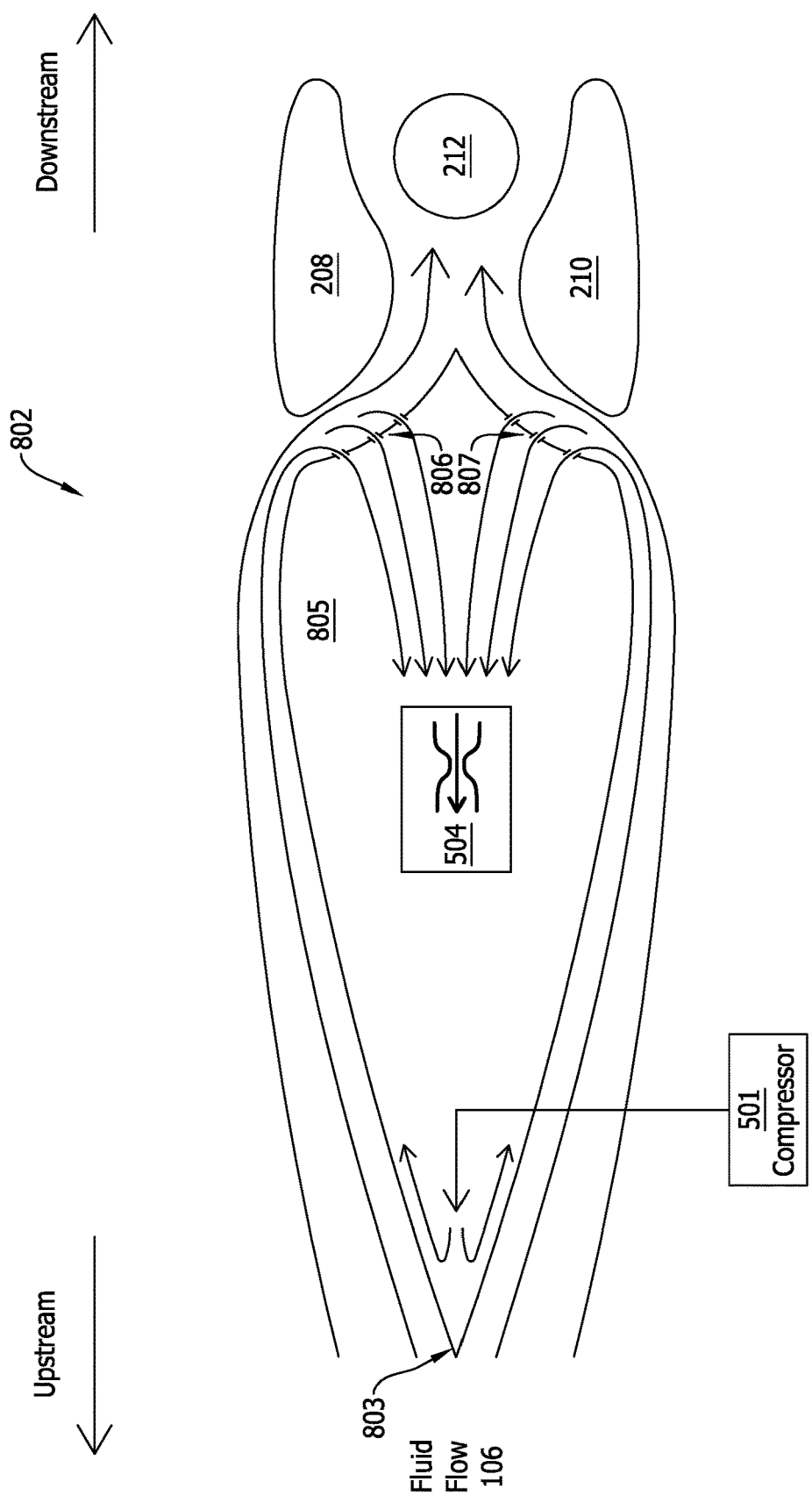
FIG. 8 is a cross-sectional view of another alternative temperature sensor assembly having a pointed leading edge.

FIG. 8 is a cross-sectional view of an alternative temperature sensor assembly 802 having a pointed body 805. Alternative temperature sensor assembly 802 is substantially identical to alternative temperature sensor assembly 502, except, as shown, that alternative temperature sensor assembly 802 includes pointed body 805. Accordingly, alternative temperature sensor assembly 802 also includes first member 208, second member 210, air injector 504, and sensor element 212. Pointed body 805 may, like body 505, include a plurality of vents, such as a first plurality of vents 806 and/or a second plurality of vents 807. Pointed body 805 may include a leading edge 803, and an internal portion of leading edge 803 may receive heated compressor air from compressor 501.

In operation, alternative temperature sensor assembly 802 may function generally as described above with respect to alternative temperature sensor assembly 502 and may, as a result of its more aerodynamic geometry, be installed within an engine (such as a turbofan engine) that produces a smoother or less turbulent airflow over alternative temperature sensor assembly 802 (e.g., in comparison to an engine that generates greater turbulence over its flow surfaces during operation, such as a turbo-propeller engine).

Figure 9:
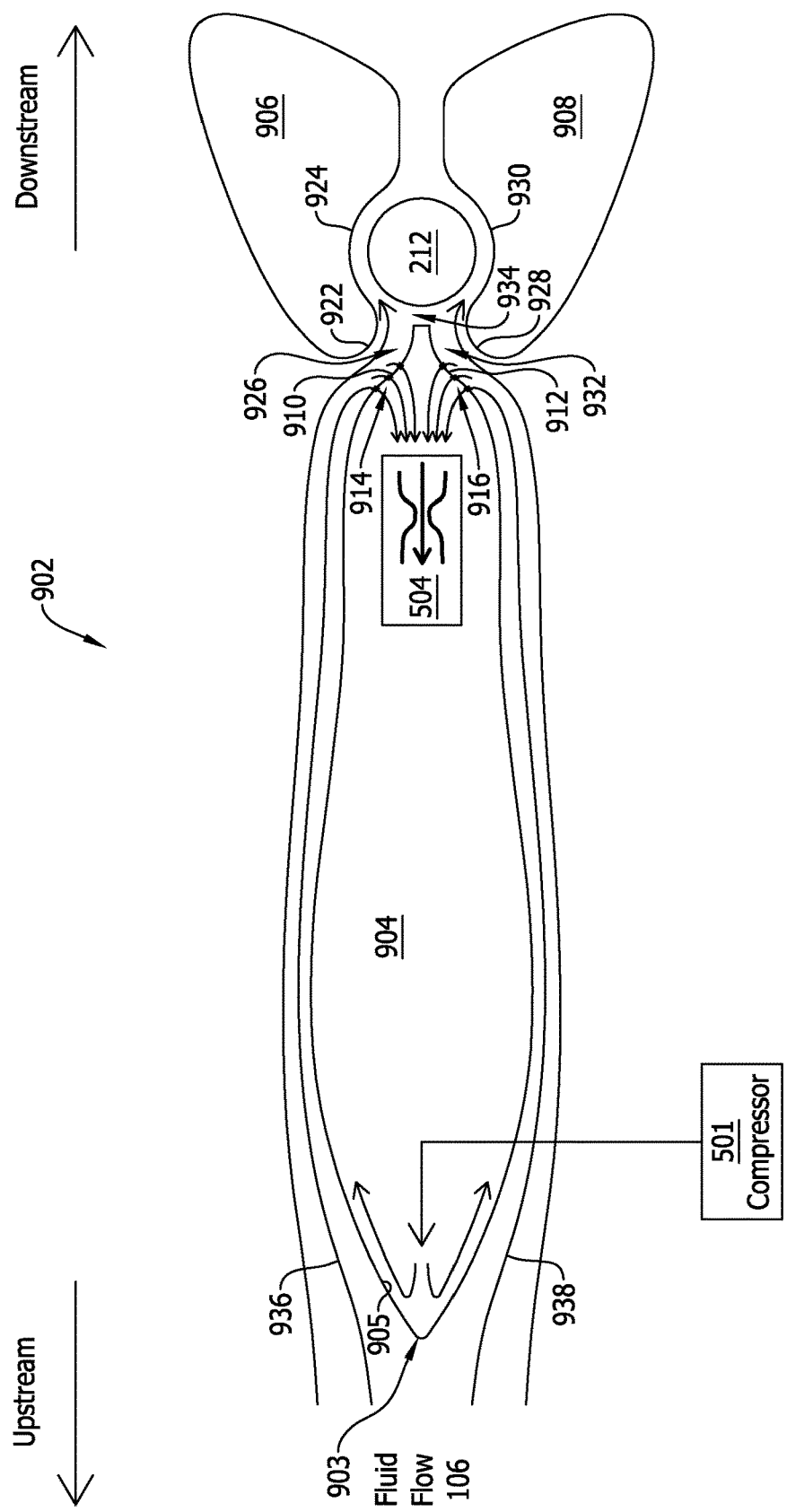
FIG. 9 is a cross-sectional view of another alternative temperature sensor assembly having a pointed leading edge.

FIG. 9 is a cross-sectional view of an alternative temperature sensor assembly 902 having a pointed body 904. In the exemplary embodiment, alternative temperature sensor assembly 902 also includes a first member 906, a second member 908, sensor element 212, and air injector 504. Pointed body 904 is torpedo-shaped and includes a pointed leading surface 903, a first concave surface 910, and a second concave surface 912. In the exemplary embodiment, pointed body 904 also includes a first plurality of vents 914 and a second plurality of vents 916. Air injector 504 may be disposed within pointed body 904. Compressor 501 may, in addition, supply heated air (e.g., heated bleed air) to an internal portion 905 of leading surface 903.

First member 906 is spaced apart from pointed body 904 and is situated downstream of pointed body 904. First member 906 includes a convex surface 922 and a concave surface 924, and a first flow channel 926 is defined between first concave surface 910 of pointed body 904 and convex surface 922 of first member 906.

Similarly, second member 908 is spaced apart from pointed body 904 and is situated downstream of pointed body 904. Second member 908 includes a convex surface 928 and a concave surface 930 and a second flow channel 932 is defined between second concave surface 912 of pointed body 904 and convex surface 928 of second member 908.

A third flow channel 934 is defined between concave surface 924 of first member 906 and concave surface 930 of second member 908. Third flow channel 934 is in fluid communication with first flow channel 926 and second flow channel 932 and receives, during operation, at least a portion of fluid flow 106 from one or both of first flow channel 926 and/or second flow channel 932. In the exemplary embodiment, third flow channel 934 is at least partially divergent. In addition, in various embodiments, third flow channel 934 may define, in conjunction with first flow channel 926 and second flow channel 932, a choked flow channel, such as a Venturi tube.

Sensor element 212 may, in addition, be disposed substantially within third flow channel 934, such that a least a portion of fluid flow 106 passing through third flow channel 934 passes over and/or makes contact with sensor element 212. For example, sensor element 212 may be disposed at least partially between concave surface 924 of first member 906 and concave surface 930 of second member 908.

Alternative temperature sensor assembly 902 may operate substantially as described herein (e.g., as described with respect to alternative temperature assembly 502), except, as described above, that the geometry of alternative sensor assembly 902 may vary from the other geometries described herein. For example, in operation, fluid flow 106 may impinge upon leading surface 903 of pointed body 904, where fluid flow 106 may be heated. As fluid flow 106 is heated, a first flow portion 936 may follow the curvature of pointed body 904 into first flow channel 926, and a second flow portion 938 may follow the curvature of pointed body 904 into second flow channel 932. In addition, and as described elsewhere herein, first flow portion 936 and second flow portion 938 may be heated as a result of contact with leading surface 903 and may be suctioned or aspirated into pointed body 904 through first plurality of vents 914 and/or second plurality of vents 916.

Embodiments of the temperature sensor assembly, as described above, include a bluff body, a first member spaced apart from the bluff body, a second member spaced apart from the bluff body, and a sensor element spaced apart from the bluff body. The bluff body may include a substantially planar leading surface, and the sensor element may be disposed downstream of the bluff body between the first member and the second member. In addition, a first flow channel may be defined between the first member and the bluff body, and a second flow channel may be defined between the second member and the bluff body. During operation, a fluid flow may initially impinge upon the substantially planar leading surface of the bluff body, and may subsequently flow downstream into the first flow channel and the second flow channel, where the fluid flow may be guided over the sensor element to sense a temperature of the fluid flow.

Exemplary technical effects of the temperature sensor assembly described herein include, for example: (a) accurate temperature readings at very large angles of attack, such as angles of attack in the range of +/−50 degrees; (b) heating of a fluid flow impinging upon the temperature sensor assembly to, for example, reduce ice formation on the assembly; and (c) aspiration or suction of heated portions of the fluid flow prior to contact with a downstream sensor element to, for example, retain measurement accuracy.

Exemplary embodiments of a temperature sensor assembly and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where temperature sensing is desired.

Use of ordinal terms, such as "first," "second," "third," etc., in the specification and claims does not by itself connote any priority, precedence, or order, such as any priority, precedence, or order of one claim element over another. In addition, the use of ordinal terms does not, by itself, connote a temporal order in which one or more acts or steps of a method are performed. Rather, absent an indication to the contrary, ordinal terms are used merely as labels to distinguish one element having a certain name from another element having the same name (but for use of the ordinal term).

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A temperature sensor assembly comprising:
   a body configured to receive a heated flow of air therein, said body comprising:
   a leading surface in thermal communication with the heated flow of air;
   a first concave surface including a first plurality of vents;
   a second concave surface including a second plurality of vents; and
   an air injector disposed within said body, said air injector configured to apply a suction pressure to said first plurality of vents and to said second plurality of vents; and
   a sensor element spaced apart from said body and disposed downstream of said body;
   wherein said body is a bluff body.

2. The temperature sensor assembly of claim 1, further comprising a first member spaced apart from said body and defining a first flow channel in relation to said body.

3. The temperature sensor assembly of claim 2, further comprising a second member spaced apart from said body and defining a second flow channel in relation to said body.

4. The temperature sensor assembly of claim 3, wherein said first member and said second member further define a third flow channel in fluid communication with and downstream of said first flow channel and said second flow channel.

5. The temperature sensor assembly of claim 4, wherein the sensor element is disposed at least partially within said third flow channel.

6. The temperature sensor assembly of claim 3, wherein said second member includes a convex surface, and wherein the second flow channel is defined between said second concave surface of said body and said convex surface.

7. The temperature sensor assembly of claim 2, wherein said first member includes a convex surface, and wherein the first flow channel is defined between said first concave surface of said body and said convex surface.

8. The temperature sensor assembly of claim 1, wherein said temperature sensor assembly is configured to operate within a range of angles of attack between twenty degrees and minus twenty degrees.

9. The temperature sensor assembly of claim 1, wherein said temperature sensor assembly is configured to operate within a range of angles of attack between fifty degrees and minus fifty degrees.

10. A temperature sensor assembly comprising:
    a body configured to receive a heated flow of air from a compressor, said body comprising:
    a leading surface in thermal communication with the heated flow of air;
    a first plurality of vents; and
    an air injector disposed within said body, said air injector configured to apply a suction pressure to said first plurality of vents; and
    a sensor element spaced apart from said body and disposed downstream of said body;
    wherein said body is a bluff body.

11. The temperature sensor assembly of claim 10, wherein said body further comprises a second plurality of vents, and wherein said air injector is further configured to apply the suction pressure to said second plurality of vents.

12. The temperature sensor assembly of claim 10, further comprising a first member spaced apart from said body and defining a first flow channel in relation to said body.

13. The temperature sensor assembly of claim 12, further comprising a second member spaced apart from said body and defining a second flow channel in relation to said body.

14. The temperature sensor assembly of claim 13, wherein said first member and said second member further define a third flow channel in fluid communication with and downstream of said first flow channel and said second flow channel.

15. The temperature sensor assembly of claim 14, wherein the sensor element is disposed at least partially within said third flow channel.

16. The temperature sensor assembly of claim 13, wherein said second member includes a convex surface, and wherein the second flow channel is defined between said body and said convex surface.

17. The temperature sensor assembly of claim 12, wherein said first member includes a convex surface, and wherein the first flow channel is defined between said body and said convex surface.

18. A method of operating a temperature sensor assembly, said method comprising:

mounting the temperature sensor assembly within an aircraft engine that generates a fluid flow, the temperature sensor assembly comprising:

a body including:

a leading surface;

a first concave surface including a first plurality of vents;

a second concave surface including a second plurality of vents; and an air injector disposed within the body;

a sensor element spaced apart from said body and disposed downstream of said body;

wherein said body is a bluff body;

supplying a heated flow of air from a compressor to an interior portion of the leading surface;

applying a suction pressure between the first plurality of vents and the air injector; and applying the suction pressure between the second plurality of vents and the air injector.

* * * * *